United States Patent [19]
Fletcher et al.

[11] 4,055,147
[45] Oct. 25, 1977

[54] AUTOMATIC FLUID DISPENSER

[76] Inventors: James C. Fletcher, Administrator of the National Aeronautics and Space Administration, with respect to an invention of; Peter C. Sakellaris, Portland, Oreg.

[21] Appl. No.: 620,675

[22] Filed: Oct. 8, 1975

[51] Int. Cl.² .............................................. A01K 7/02
[52] U.S. Cl. ................................ 119/72.5; 119/51.11; 137/624.11
[58] Field of Search ...................... 119/51.5, 51.11, 71, 119/72, 72.5, 73, 74, 80, 18, 51 R; 222/70, 36; 137/624.11, 625.65, 554, 551

[56] References Cited
U.S. PATENT DOCUMENTS

| | | | |
|---|---|---|---|
| 2,528,898 | 11/1950 | McIlvaine | 137/554 |
| 2,710,593 | 6/1955 | Lippi | 119/71 |
| 3,089,463 | 5/1963 | Grunzke | 119/71 |
| 3,110,287 | 11/1963 | Godshalk | 119/72 |
| 3,192,902 | 7/1965 | Gammill | 119/71 |
| 3,269,358 | 8/1966 | Hawley | 119/18 |
| 3,720,185 | 3/1973 | Aldous | 119/51.11 |
| 3,779,210 | 12/1973 | Blair | 119/71 |
| 3,782,334 | 1/1974 | Leon et al. | 119/51 R |

*Primary Examiner*—Louis G. Mancene
*Assistant Examiner*—Peter K. Skiff
*Attorney, Agent, or Firm*—Darrell G. Brekke; John R. Manning

[57] ABSTRACT

An apparatus for dispensing fluid according to a time schedule is disclosed. Fluid automatically flows to individual dispensing units at predetermined times from a fluid supply and is available only for a predetermined interval of time after which an automatic control causes the fluid to drain from the individual dispensing units. Fluid deprivation continues until the beginning of a new cycle when the fluid is once again automatically made available at the individual dispensing units.

11 Claims, 2 Drawing Figures

AUTOMATIC FLUID DISPENSER

ORIGIN

The invention described herein was made in the performance of work under a NASA contract and is subject to the provisions of Section 305 of the National Aeronautics and Space Administration Act of 1958, Public Law 85-568 (72 stat. 435; 42 U.S.C. 2457).

BACKGROUND OF THE INVENTION

1. Field of the Invention

This invention relates to fluid dispensing systems which automatically dispense fluid to animals only during predetermined periods of time.

2. Description of the Prior Art

Experiments and controlled feeding often require maintaining animals on a fluid restriction regimen. These restrictions may require limiting the amount of fluid an animal may consume, the time period during which the animal may consume the fluid, or some combination of both of these restrictions. Controlled feeding programs in which a fluid is available to an animal at the same time every day present scheduling difficulties. Typically, glass bottles containing fluid are manually placed in the animal's cage each time access to the fluid is required. This manual procedure often produces cumbersome work schedules for experimentors and laboratory personnel, particularly when the experiments last several weeks or months, including weekends and holidays.

U.S. Pat. No. 3,294,066 describes an animal feeding system wherein a time actuated valve causes a predetermined amount of water to enter a feeding unit where it will mix with a dry food material and the weight of such mixture will downwardly displace the feeding unit so as to expose a feeding nipple portion, thus allowing the animal to feed from the unit. This system, unlike the present invention, lacks a provision for draining or retrieving any fluid remaining when an animal feeding interval is over and it requires that a disposable feeding bag be replaced after each use. Additionally, this system differs from the present invention in that it is designed to dispense a fixed amount of fluid and is not adaptable to experiments where the watering time interval, rather than the quantity of fluid to be consumed, is to be restricted.

U.S. Pat. No. 3,720,185 discloses an automatic animal feeding system in which a level sensing device controls the amount of liquid delivered to a chamber where it is mixed with a solid food material and then dispensed at individual feeding points. This system utilizes automatic valves to dispense the food but is designed to provide a predetermined amount of food to an animal rather than to allow the animal access for a limited period of time.

SUMMARY OF THE INVENTION

The present invention is an apparatus for automatically dispensing fluid for limited intervals of time at predetermined times, and may be utilized to provide an animal access to water or other fluids during an experiment. This invention can free laboratory personnel and others in charge of feeding and watering animals according to strict time schedules, from these cumbersome duties, so that they may more effectively be utilized. It also serves to decrease manpower expenditures by eliminating the necessity of manually providing fluid for animals, particularly on weekends and holidays. Additionally, it reduces the disturbances caused by attendants manually feeding and watering the animals which may introduce variables or otherwise interfere with laboratory studies being conducted.

In the present invention automatically actuated valves control the availability of fluid from a supply to individual fluid dispensing units. The individual dispensing units comprise tubing extending into an animal cage terminating in a licking dispenser. One of the valves controls the flow of fluid from the supply and another valve drains the fluid from the system when the animal is to be deprived of it. A third valve allows air to escape from the system when it is being filled to prevent air pockets. A timing device automatically actuates the valves in correct sequence.

DESCRIPTION OF THE PREFERRED EMBODIMENT

Figure 1:
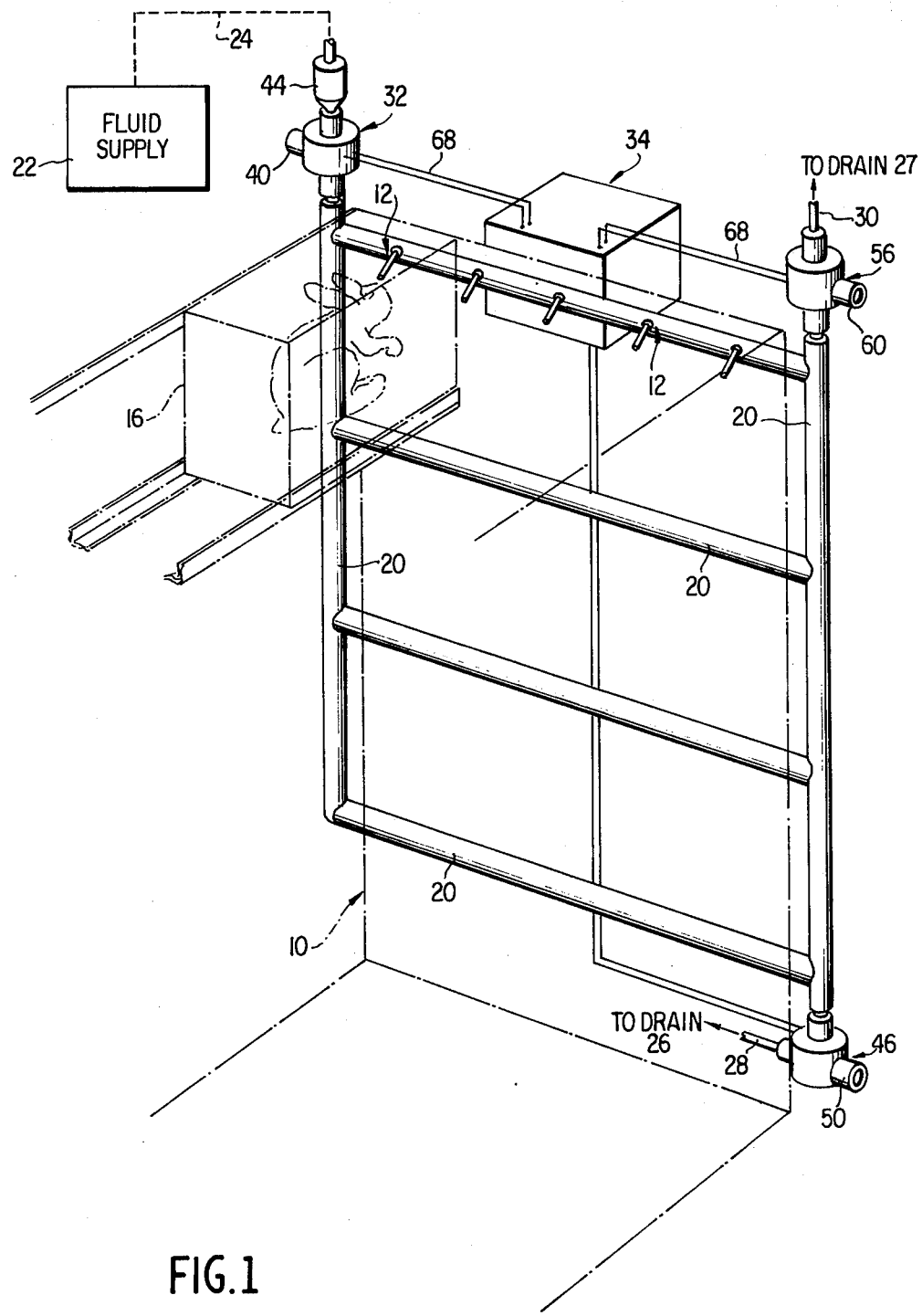
FIG. 1 is a partial perspective view of the system showing one individual cage and an animal within it.

FIG. 1 illustrates an automatic fluid dispensing apparatus constructed according to the present invention in its preferred field of application. A plurality of individual animal cages 16 are mounted in a rack 10 which compactly houses the cages in a plurality of rows. Associated with the rack 10 is the fluid dispensing apparatus of the present invention. The fluid dispensing apparatus of the present invention includes a plurality of individual fluid dispensing units 12 which are coupled to each other by conduit 20. Associated with conduit 20 are solenoid controlled intake valve 32, solenoid controlled outlet valve 46 and solenoid controlled bleeder valve 56. A source of fluid not shown is coupled to solenoid controlled intake valve 32. Timing device 34 controls the activation of valves 32, 46 and 56 in a manner to be explained in detail in conjunction with FIG. 2 so that fluid is selectively dispensed to the dispensing units 12 from the source of fluid by means of conduit 20 for predetermined intervals of time.

Figure 2:
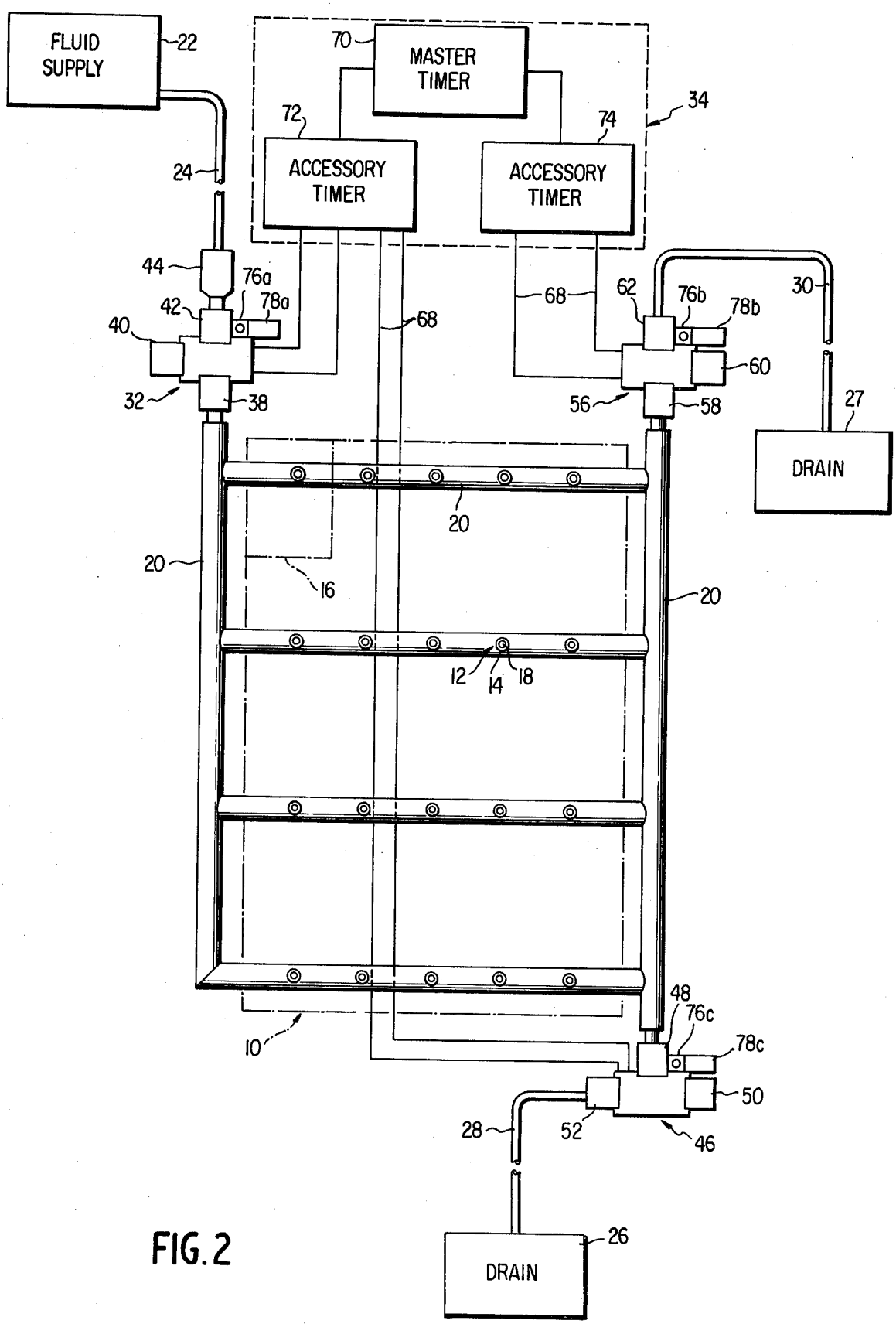
FIG. 2 is a schematic view of the system constructed according to the present invention.

FIG. 2 schematically illustrates a fluid dispensing apparatus constructed according to the present invention. In the fluid dispensing apparatus of the present invention, a plurality of individual fluid dispensing units 12 are provided which are comprised of tubing 14 for carrying fluid into the individual animal cages 16. The units 12 terminate in a licking dispenser 18, from which the animal may obtain fluid by licking or sucking. Attached to rack 10 is conduit 20 which connects the individual fluid dispensing units 12 to a fluid supply 22 through an intake line 24 and to drains 26 and 27 through drainage lines 28 and 30. In the preferred embodiment of the invention, the individual animal cages 16 are mounted in a Hardco Scientific rat cage (Model No. RR-240) which has factory-assembled piping 20 and a plurality of individual fluid dispensing units 12 for providing water or other fluids to the animals.

In the present invention, a first automatic control causes fluid to flow from the supply to the individual fluid dispensing units during predetermined intervals and prevents the flow of fluid from the supply to the dispensing units after completion of the predetermined dispensing interval. In the preferred embodiment, the first automatic control comprises a solenoid controlled intake valve 32 mounted above the conduit 20 and actuated by a timing device 34. In intake valve 32, orifice 38 is coupled to conduit 20, orifice 40 is coupled to the atmosphere and orifice 42 is coupled by means of coupling device 44 to the intake line 24 which is coupled to the fluid supply 22.

A second automatic control causes a flow of fluid from the individual dispensing units to the drain after completion of a predetermined dispensing interval. In the preferred embodiment, the second automatic control comprises a solenoid controlled outlet valve 46 actuated by the timing device 34. The solenoid controlled outlet valve 46 is located below the conduit 20 so that gravity will aid in draining excess fluid from the conduit 20 and tubing 14. In solenoid controlled valve 46, orifice 48 is coupled to the conduit 20, orifice 50 is coupled to the atmosphere and orifice 52 is coupled by tubing 28 to the drain 26.

A third automatic control can be utilized to allow the discharge of air displaced from the conduit 20 and the individual dispensing units 12 during the entry of fluid to prevent the creation of air pockets within the system. In the preferred embodiment the third automatic control comprises a solenoid controlled bleeder valve 56 actuated by the timing device 34. In solenoid controlled bleeder valve 56, orifice 58 is coupled to the conduit 20, orifice 60 is coupled to the atmosphere and orifice 62 is coupled by tubing 30 to the drain 27.

Although any well known solenoid controlled valve may be used as the solenoid controlled valves 32, 46 and 56 it has been found that valve No. 8320A9, manufactured by the Automatic Switch Company, works satisfactorily.

Each of the solenoid controlled valves is coupled to a timing device 34 which controls the operation of valves. The particular construction of the timing device 34 is not critical to the proper functioning of the present invention and any suitable timing apparatus may be utilized. In the preferred embodiment, each of the solenoid controlled valves is connected by leads 68 to the timing device 34. The timing device 34 comprises a master timer 70 which activates and deactivates two 0-60 minute electronic accessory timers 72 and 74. The accessory timers 72 and 74 in turn activate the valves through relay switches not shown. Intake valve 32 and outlet valve 46, which are switched at the same time in an operating sequence, are controlled by one accessory timer 72, while bleeder valve 56 is controlled by the other accessory timer 74 allowing it to be independently scheduled.

The master timer 70 is a readily available 24-hour electronic timer which activates the accessory timers 72 and 74 once per day by allowing current to flow to them for a predetermined period of time and then deactivates by shutting off the current flow. The accessory timers 72 and 74 are identical to each other and allow current to pass through them only for a predetermined period of time after which the current flow will be shut off. These accessory timers 72 and 74 will not pass a current until they have been activated again by the master timer 70 during the next cycle. Other suitable arrangements for the timing device 34 may be utilized within the scope of the present invention. For example, a timing device may be constructed which eliminates the need for a separate master timer to control the accessory timers.

Indicators 76 a, b, c, may be coupled to each valve or to the timing device 34 to indicate the status of the individual valves, that is, whether the valve is activated or deactivated. Such devices could also be used to determine the status of the entire system or to spot system malfunctions. Any suitable device, such as one utilizing light bulbs to indicate whether the valve was activated or deactivated, can be used.

Finally, counters 78 a, b, c, may be added to the system. Such devices may be coupled to the timing device or to individual valves to indicate the number of activations of the system. Any suitable, readily available, electronic, electro-mechanical or other type of counter can be utilized.

Operation of Preferred Embodiment

Experiments and controlled feeding often require maintaining animals on a fluid restriction regimen including restrictions on the period of time when an animal may consume a fluid. At the initiation of a feeding schedule with the present invention, the conduit 20 and the individual fluid dispensing units 12 have no fluid in them and valve orifices 42, 50 and 62 are closed while all other orifices are open. This allows the atmosphere to enter intake valve 32 and any fluid that might remain within the conduit 20 from previous feeding schedules to drain from the outlet valve 46. When the feeding schedule requires allowing the animals access to fluid, the preprogrammed timing device 34 will activate all valves simultaneously thereby closing orifices 40, 48 and 60 while opening orifices 42, 50 and 62. This results in fluid entering the system through the intake valve 32 while the closed outlet valve 46 prevents fluid flowing to the drain 26. Activation of the bleeder valve 56 allows the discharge of air into the atmosphere which is displaced by the fluid as it enters the conduit 20 and tubes 14, thereby preventing the formation of air pockets within the system. The bleeder valve 56 remains open for a period of time sufficient to permit filling the system and discharging the displaced air after which the orifice 58 is automatically closed and the fluid pressure at the intake valve orifice 42 may be increased. Although the intake, outlet and bleeder valves all are activated simultaneously, the duration of their cycles varies. The intake 32 and outlet valves 46 remain activated during the entire fluid dispensing interval whereas the bleeder valve 56 is only activated while the system is being filled with fluid. The requisite operating time for the bleeder valve 56 is dependent upon system parameters including system size and fluid pressure, but satisfactory operation may be obtained by initially measuring the amount of time it takes until fluid, without air bubbles, flows from the bleeder valve orifice 62 and then programming the timing device 34 to regulate the valve 56 accordingly. During the fluid dispensing interval when the animals are given access to the fluid, valves 32 and 46 remain activated with orifices 42 and 50 open and orifices 40 and 48 closed. At the expiration of the dispensing interval, valves 32 and 46 are deactivated closing orifices 42 and 50 and opening orifices 40 and 48, causing the fluid to drain rapidly from the system through the outlet valve 46. This sequence is then repeated for as many days or weeks as are necessary to complete an experiment.

Although the present invention has been described in terms of a preferred embodiment, it is to be understood that numerous modifications and variations may be made thereto without departing from the spirit and scope of the invention.

The automatic controls do not have to be connected to the timing device by wires but may be coupled by other means as for example by transmitting and receiving electromagnetic radiation.

The third automatic control bleeder valve which allows the displaced air to escape does not have to be solenoid-controlled, timer-activated valve, but may be any suitable automatically controlled bleeder system.

The licking dispenser may be any appropriate device which dispenses fluid in response to the animal's licking or sucking, as for example, a nipple.

The intake and bleeder valves do not have to be located above the conduit or piping and the outlet valve below the conduit to allow gravity to fill and drain the system. The configuration of the apparatus may be changed by utilizing positive pressure or vacuum pumps. For example, a positive pressure pump could be used to force water into the intake valve. Thus, since gravity would not be the only force filling the system, the intake valve need not be located above the conduit but could be located below.

All modifications and variations are intended to be within the purview and scope of the appended claims.

What is claimed is:

1. An automatic fluid dispensing apparatus comprising:
    a. a supply of fluid to be dispensed;
    b. a drain for said fluid;
    c. one or more individual fluid dispensing units each adapted to dispense fluid when sucked by a user;
    d. conduit means for coupling said individual fluid dispensing units to said supply and to said drain;
    e. first automatic control means adjacent said supply for causing a flow of the fluid from the supply to the individual fluid dispensing units during predetermined dispensing intervals and for preventing flow of the fluid from the supply to the dispensing units after completion of said predetermined dispensing intervals; and
    f. second automatic control means to cause a flow to said drain, via said conduit means, of all fluid in said conduit means except the portion between said fluid supply and said first automatic control means, said flow being caused at the completion of each predetermined dispensing interval.

2. Automatic fluid dispensing apparatus according to claim 1 wherein:
    a. the first automatic control means is a solenoid controlled valve actuated by electronic timer means; and
    b. the second automatic control means is a solenoid controlled valve actuated by electronic timer means.

3. Automatic fluid dispensing apparatus according to claim 1 wherein:
    a. said first automatic control means is a solenoid controlled valve having three orifices:
       the first orifice is coupled to said supply of fluid;
       the second orifice is coupled to the atmosphere; and
       the third orifice is coupled to said individual fluid dispensing units;
    b. said seocnd automatic control means is a solenoid controlled valve having three orifices:
       the first orifice is coupled to the drain;
       the second orifice is coupled to the atmosphere; and
       the third orifice is coupled to the individual fluid dispensing units.

4. Automatic fluid dispensing apparatus according to claim 3 further comprising:
    a. counter means for indicating the number of activations of each of said valves.

5. Automatic fluid dispensing apparatus according to claim 3 further comprising:
    a. indicator means for indicating the state of each of said valves.

6. Automatic fluid dispensing apparatus according to claim 5 wherein the indicator means is a light.

7. Automatic fluid dispensing apparatus according to claim 1 further comprising:
    a. third automatic control means to allow discharge of air displaced from said conduit means and individual dispensing units while the conduit means and dispensing units are being filled with fluid from the supply.

8. Automatic fluid dispensing apparatus according to claim 7 wherein:
    a. the first automatic control means is a solenoid controlled valve actuated by electronic timer means;
    b. the second automatic control means is a solenoid controlled valve actuated by electronic timer means; and
    c. the third automatic control means is a solenoid controlled valve actuated by electronic timer means.

9. Automatic fluid dispensing apparatus according to claim 7 wherein:
    a. said first automatic control means is a solenoid controlled valve having three orifices:
       the first orifice is coupled to the supply of fluid;
       the second orifice is coupled to the atmosphere; and
       the third orifice is coupled to the individual fluid dispensing units;
    b. said second automatic control means is a solenoid controlled start valve having three orifices:
       the first orifice is coupled to the drain;
       the second orifice is coupled to the atmosphere; and
       the third orifice is coupled to the individual fluid dispenser; and
    c. said third automatic control means is a solenoid controlled valve having three orifices:
       the first orifice is coupled to the atmosphere;
       the second orifice is coupled to the drain; and
       the third orifice is coupled to the supply.

10. Automatic fluid dispensing apparatus according to claim 9 further comprising
    a. counter means for indicating the number of activations of each of said valves.

11. Automatic fluid dispensing apparatus according to claim 10 further comprising:
    a. indicator means for indicating the state of each of said valves.

* * * * *